US012767206B2

(12) United States Patent
Altherr et al.

(10) Patent No.: US 12,767,206 B2
(45) Date of Patent: Oct. 20, 2026

(54) ADJUSTING UNIT OF A STEERING COLUMN

(71) Applicant: Schaeffler Technologies AG & Co. KG, Herzogenaurach (DE)

(72) Inventors: Jannick Altherr, Bühl (DE); Benjamin Severin, Baiersbronn (DE); Martin Vornehm, Bühl (DE); Balamurugan Manoharan, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/124,584

(22) PCT Filed: Aug. 30, 2023

(86) PCT No.: PCT/DE2023/100629

§ 371 (c)(1),
(2) Date: Apr. 25, 2025

(87) PCT Pub. No.: WO2024/088458

PCT Pub. Date: May 2, 2024

(65) Prior Publication Data

US 2026/0175901 A1 Jun. 25, 2026

(30) Foreign Application Priority Data

Oct. 28, 2022 (DE) ..................... 10 2022 128 651.7
Mar. 6, 2023 (DE) ..................... 10 2023 105 450.3

(51) Int. Cl.
*B62D 1/185* (2006.01)
*B62D 1/181* (2006.01)

(52) U.S. Cl.
CPC ............ *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS 2,836,988 A * 6/1958 Cashman ............... B62D 1/181 74/493
4,317,387 A * 3/1982 Myers ..................... F16B 7/105 403/328

(Continued)

FOREIGN PATENT DOCUMENTS

DE 19812179 C1 8/1999
DE 10326119 B3 * 2/2005 ............. B62D 1/181

(Continued)

OTHER PUBLICATIONS

Source: Notice of Reasons for Refusal Corresponding to Japanese Patent Application No. 2025-524420, dated May 11, 2026.

*Primary Examiner* — Jason D Shanske
*Assistant Examiner* — Shams Dhanani

(57) ABSTRACT

The disclosure relates to an adjusting unit for a steering system of a vehicle having an adjusting motor, a spindle, and a spindle nut. Rotation of the spindle via the adjusting motor produces an axial movement of the spindle nut along the spindle. A pull-out device with a pull-out support is arranged on the body of the vehicle. At least one inner pull-out element of the pull-out support is coupled to a steering shaft. A crash element is configured as a sleeve that extends between the spindle nut and the inner pull-out element. The sleeve is coupled to the spindle nut via at least one securing element that is released in the event of a specified impact force (F), and the sleeve moves axially relative to the spindle nut, resulting in plasticizing of an outer contour of the spindle nut and an inner contour of the sleeve.

20 Claims, 9 Drawing Sheets

(56) References Cited

U.S. PATENT DOCUMENTS

| | | | | | |
|---|---|---|---|---|---|
| 5,626,363 | A | * | 5/1997 | Rispeter | B62D 1/192<br>280/775 |
| 10,926,787 | B2 | | 2/2021 | Swamidason et al. | |
| 2008/0079253 | A1 | | 4/2008 | Sekii et al. | |
| 2020/0317251 | A1 | | 10/2020 | Munding | |

FOREIGN PATENT DOCUMENTS

| | | | | | |
|---|---|---|---|---|---|
| DE | 102018202157 | A1 | | 8/2019 | |
| DE | 102023100996 | A1 | | 7/2024 | |
| EP | 1342639 | A2 | | 9/2003 | |
| EP | 3476692 | B1 | | 12/2020 | |
| EP | 3956201 | B1 | * | 1/2024 | B62D 1/181 |
| JP | 2002002503 | A | | 1/2002 | |
| JP | 2003276616 | A | | 10/2003 | |
| JP | 2005082062 | A | | 3/2005 | |
| JP | 2006510527 | A | | 3/2006 | |
| JP | 2007125956 | A | | 5/2007 | |
| JP | 2008087531 | A | | 4/2008 | |
| JP | 2008296752 | A | | 12/2008 | |
| JP | 2009132358 | A | | 6/2009 | |
| JP | 2019156334 | A | | 9/2019 | |
| JP | 2020019325 | A | | 2/2020 | |
| WO | 2022043533 | A1 | | 3/2022 | |

* cited by examiner

ADJUSTING UNIT OF A STEERING COLUMN

CROSS-REFERENCE TO RELATED APPLICATIONS

This application is the U.S. National Phase of PCT Application No. PCT/DE2023/100629 filed on Aug. 30, 2023, which claims priority to DE 10 2022 128 651.7 filed on Oct. 28, 2022, and DE10 2023 105 450.3 filed on Mar. 6, 2023, the entire disclosures of which are incorporated by reference herein.

TECHNICAL FIELD

The present disclosure relates to an adjusting unit of a steering column or a steering shaft of a vehicle and a steer-by-wire steering system for a vehicle with such an adjusting unit.

BACKGROUND

In modern steering systems or steering devices, the steering wheel can be adjusted in height and length, i.e., in an axial position. In such adjustment systems, steering column elements or steering shaft elements can be moved relative to one another, for example as a telescopic arrangement. This allows the steering wheel to be moved to a position that suits the driver.

Furthermore, steer-by-wire steering systems are also known, in which the mechanical connection of the steering wheel and the axle to be steered via the steering column is dispensed with and the steering of the wheels is controlled via corresponding signals. There are two main types of steer-by-wire steering systems: steer-by-wire steering systems with a force-feedback actuator remote from the steering wheel and steer-by-wire steering systems with a force-feedback actuator close to the steering wheel.

Steer-by-wire steering systems with a force-feedback actuator remote from the steering wheel use known crash elements, such as metal strips that plastically deform when a defined force is exceeded. Furthermore, plastic sleeves on the telescopic steering shaft are also known, which are destroyed by a specified force. In steer-by-wire steering systems with a force-feedback actuator close to the steering wheel, the telescopic steering shaft can be omitted.

It has now become apparent that there is a further need to improve a known adjusting unit and/or a known steer-by-wire steering system of a vehicle. In particular, there is a further need to provide an adjusting unit and/or a steer-by-wire steering system with a force-feedback actuator close to the steering wheel, which make it possible to arrange a crash element in such a way that transverse forces on the crash element can be reduced or even avoided.

SUMMARY

Against this background, it is an object of the present disclosure to provide an improved adjusting unit and/or an improved steer-by-wire steering system, which in particular makes it possible to arrange a crash element in such a way that transverse forces on the crash element can be reduced or even avoided.

These and other objects which are mentioned later in the following description or which can be recognized by the person skilled in the art are achieved by the subject matter described herein.

The adjusting unit according to the disclosure for a steering system of a vehicle, in particular a steer-by-wire steering system, further, in particular a steer-by-wire steering system with a force-feedback actuator close to the steering element, includes an adjustment unit, a pull-out device, and a crash element. The adjustment unit has an adjusting motor, a spindle, and a spindle nut, and the adjusting motor is coupled to the spindle so as to transmit a torque, and the spindle nut is arranged on the spindle such that a rotation of the spindle produces an axial movement of the spindle nut along the spindle. The pull-out device has a pull-out support, which is designed to be arranged or fastened in an axially fixed manner, and in particular pivotable about a pivot axis, on a body of the vehicle, and at least one inner pull-out element which is arranged in the pull-out support in an axially movable manner relative to the pull-out support. The inner pull-out element is designed to be coupled to an, in particular inner, steering shaft in an axially fixed manner. The crash element is designed as a sleeve which extends between the spindle nut of the adjustment unit and the inner pull-out element of the pull-out device coaxially to the spindle, and in particular surrounding the spindle. An axial end of the sleeve is arranged on the spindle nut and is coupled to the spindle nut in an axially fixed manner via at least one securing element. The securing element is released when a specified (or predetermined) impact force is applied, particularly in the event of a crash, and the sleeve moves axially relative to the spindle nut due to the impact force applied in the event of a crash. An outer contour of the spindle nut and an inner contour of the sleeve are designed in a coordinated way at least in some sections such that the sleeve is plasticized, i.e., deformed, as a result of the axial movement relative to the spindle nut.

The securing element can also be referred to as a release element and is designed to position the sleeve in an axially fixed manner on the spindle nut. Furthermore, the securing element is designed to release the axially fixed connection between the sleeve and the spindle nut when the specified impact force is reached or exceeded, in order to allow movement of the sleeve relative to the spindle nut and the associated plasticization (or plastic deformation) of the sleeve. The movement path of the sleeve can, for example, be about 80-100 mm. The securing element can, for example, be designed as at least one shear pin which breaks when the specified impact force is reached or exceeded. Furthermore, it is also conceivable to implement the securing element as a circumferential or at least partially circumferential groove or as indentations in the sleeve, which is deformed by the impact force.

The force-feedback actuator comprises a motor, or a motor and a gearbox, in particular with a high gear ratio. The motor and gearbox combination makes it possible, in particular, to design a smaller and more compact motor, since the motor has to generate a lower torque than a motor without a gearbox in order to achieve the same torque on the steering shaft.

The advantage of the solution according to the disclosure lies in particular in the fact that the crash element can be integrated into the pull-out device and in particular into the force flow there. Such a substantially coaxial arrangement of the crash element to the spindle makes it possible to achieve a force flow in the event of a crash through which only minimal or no transverse forces or bending moments act on the crash element. Transverse forces or bending moments on the crash element can cause the crash element to jam and/or tilt, as well as increase friction and/or cause lateral bending in the crash sleeve. Since, according to the disclosure, only minimal or no transverse forces or bending moments act on the crash element, the design of the crash element can be simplified, since the disadvantages caused by transverse forces or bending moments are eliminated. This means that few or no additional components are required, which can reduce the cost of the adjusting unit. In addition, it is possible to use these components as forming tool elements during production.

In addition, the arrangement of the crash element according to the disclosure enables an impact energy conversion in the form of an absorption as well as a self-centering of the crash element to the spindle nut, in particular in the event of jamming and/or tilting and/or offset forces. At the same time, a spindle torque can be supported by the crash element when the length of the steering element is adjusted. In addition, the spindle can be guided and/or mounted through the crash element (and the spindle nut). This can be particularly advantageous for long spindles, e.g., with a length of approximately 100 mm or more.

In other words, it can be said that the adjusting unit according to the disclosure makes it possible to reduce or even eliminate the bending moments acting on the crash element, which usually result from unfavorable lever arms. This makes it possible to dispense with additional components, such as a crash element guide, connection, and/or deflection.

According to an example embodiment, the inner contour of the unplasticized sleeve has deformation areas and buffer areas at least in sections, and the outer contour of the spindle nut is designed such that the outer contour of the spindle nut overlaps with the inner contour of the sleeve in the deformation areas and is arranged in particular at a distance from the buffer areas. In the event of a crash, the impact force pushes the crash element, i.e., the sleeve, which can also be referred to as the crash sleeve, substantially symmetrically over the substantially fixed, self-locking spindle nut. For this purpose, the spindle nut has a harder material than the crash sleeve, at least in the overlapping areas on the outer contour.

Due to the overlap of the outer contour of the spindle nut and the inner contour of the sleeve in the deformation areas, the crash sleeve is plasticized, i.e., deformed, by the spindle nut in these areas. To prevent the crash sleeve from tearing during plasticization, the spindle nut and the crash sleeve are spaced apart from each other in the buffer area so that, during plasticization of the crash sleeve in the deformation areas, the “missing” material can be compensated for by the buffer zones. In other words, it can be said that the plasticization of the crash sleeve in the deformation areas substantially changes the entire inner contour of the sleeve.

According to an example embodiment, the spindle nut has a conical and/or spherical outer contour. This makes it possible for the crash sleeve to center itself if an impact force is not introduced symmetrically into the crash sleeve, which can cause at least slight transverse forces to act on the crash sleeve. This prevents the crash sleeve from jamming on the spindle nut and thus ensures the function of the crash element, namely the absorption of impact energy through plasticization, even in the event of transverse and/or offset forces.

According to an example embodiment, the sleeve is coupled flat to the inner pull-out element at the other axial end. This ensures a symmetrical introduction of force over the entire front surface of the crash sleeve that rests on the pull-out element. The large support surface enables a high level of tipping rigidity to be achieved.

According to an example embodiment, the sleeve has a rectangular inner contour with rounded corners and the spindle nut has a rectangular outer contour with rounded corners, and the rounded corners of the inner contour of the sleeve have a larger radius than the rounded corners of the outer contour of the spindle nut. Due to the overlapping radii, the large radius of the crash sleeve is plasticized, i.e., deformed, by the smaller radius of the spindle nut, so that the radius of the crash sleeve after plasticization substantially corresponds to the radius of the spindle nut. However, other contours and contour pairings for the crash sleeve and the spindle nut are also conceivable. In particular, it is possible to select the contours and/or the overlap (small or large overlap) of the contours in the deformation areas depending on a desired push-through force and/or the impact force.

According to an example embodiment, the adjustment unit, and thus in particular the crash element, is arranged within the pull-out device, in particular within the pull-out support. This arrangement is possible in particular due to the elimination of the telescopic steering shaft in steer-by-wire steering systems with a force-feedback actuator close to the steering element, as this “frees up” installation space within the pull-out device. This means that no additional installation space is required for the adjusting unit and the crash element can be integrated into the force flow that occurs in the event of a crash.

According to an example embodiment, the adjustment unit, and thus in particular the crash element, is arranged outside the pull-out device, and the crash element and the spindle (and the spindle nut) are arranged coaxially. The crash element is also arranged outside the pull-out device between the adjustment unit and the pull-out device.

According to one embodiment, the sleeve is made of a metal, in particular a sheet metal. The sleeve formed from a sheet metal material can be produced cost-effectively, for example by punching and forming the sheet metal. In addition, the sheet material has good plasticizing properties. Furthermore, sleeves made of fiber composite materials are also conceivable, although these are more expensive than metal.

According to an example embodiment, the spindle nut is made of a metal which is harder than the material of the sleeve at least in sections, in particular on an outer circumference, i.e., the outer contour, and further in particular on the areas of the outer contour which overlap with the inner contour of the sleeve. This ensures that, in the event of a crash, the sleeve serves as an energy absorber and is plasticized by the spindle nut, and the spindle nut does not experience plasticization by the sleeve.

According to an example embodiment, the spindle nut has a main body made of a plastic and a sheath made of a, in particular hardened, metal. The sheath can be made of a sheet metal material, which is in particular deep-drawn and hardened. This means that the sheath can be produced cost-effectively. The plastic main body of the spindle nut makes it possible to improve the noise characteristics of the adjusting unit.

A further aspect of the disclosure relates to a steer-by-wire steering system, in particular a steer-by-wire steering system with a force-feedback actuator close to the steering element, for a vehicle. The steering system has an (inner) steering shaft, a steering element and the adjusting unit described above and below, in particular the one according to the disclosure. The steering element is coupled with the (inner) steering shaft in an axially fixed manner and so as to transmit a torque. The (inner) steering shaft is also arranged within the pull-out support of the adjustment unit and is coupled to the inner pull-out element in an axially fixed manner, and is thus arranged in an axially movable manner relative to the pull-out support via or with the inner pull-out element. In addition, the steering shaft can be rotated relative to the inner pull-out element.

According to an example embodiment, the steer-by-wire steering system also has at least one force-feedback actuator which is coupled to the (inner) steering shaft close to the steering element and so as to transmit a torque. The term "close to the steering element" is understood here to mean in particular an arrangement between the adjusting unit and the steering element.

According to an example embodiment, the steer-by-wire steering system further comprises a height adjusting unit for adjusting the height of the steering element. This means that the steering element can be individually adjusted for a driver in both an axial direction and a height direction.

BRIEF DESCRIPTION OF THE DRAWINGS

Further measures to improve the disclosure are shown in more detail below together with the description of an example embodiment of the disclosure based on the figures. In the figures.

DETAILED DESCRIPTION

The figures are only schematic in nature and serve only for understanding of the disclosure. Identical elements are provided with the same reference signs.

Figure 1:
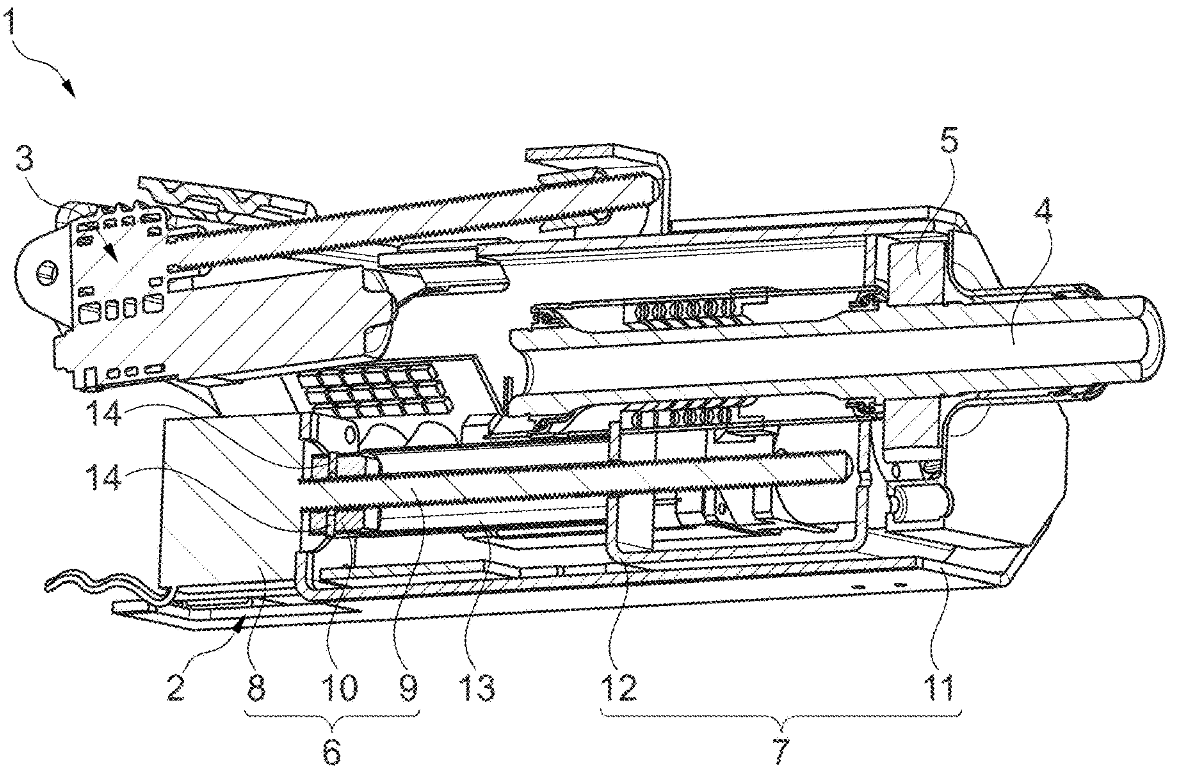
FIG. 1 shows a schematic representation of a steer-by-wire steering system according to an embodiment of the disclosure in a perspective longitudinal sectional view.
Figure 2:
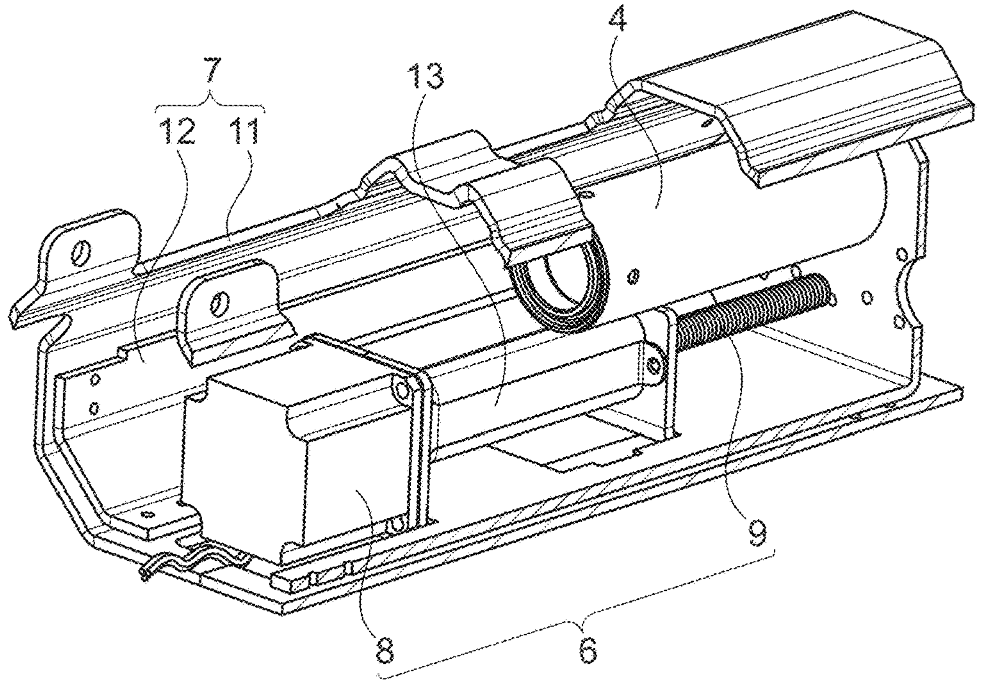
FIG. 2 shows a schematic representation of an adjusting unit according to an embodiment of the disclosure in a perspective partial sectional view.

FIG. 1 shows schematically and by way of example a steer-by-wire steering system 1 for a vehicle in a perspective sectional view. The steer-by-wire steering system 1 has an adjusting unit 2 (see also FIG. 2) for the axial length adjustment or setting of a steering element, e.g., a steering wheel (not shown), and a height adjusting unit 3 for adjusting the height of the steering element. The longitudinal adjustment of the steering element is realized in particular by an axial movement of a steering shaft 4 that can be coupled to the steering element so as to transmit a torque. Furthermore, the steering system 1 has a force-feedback actuator 5, which is coupled to the steering shaft 4 so as to transmit a torque and is arranged close to the steering element on the steering shaft 4. The force-feedback actuator 5 may comprise a motor or a motor in combination with a gearbox (shown here as an example).

Figure 3:
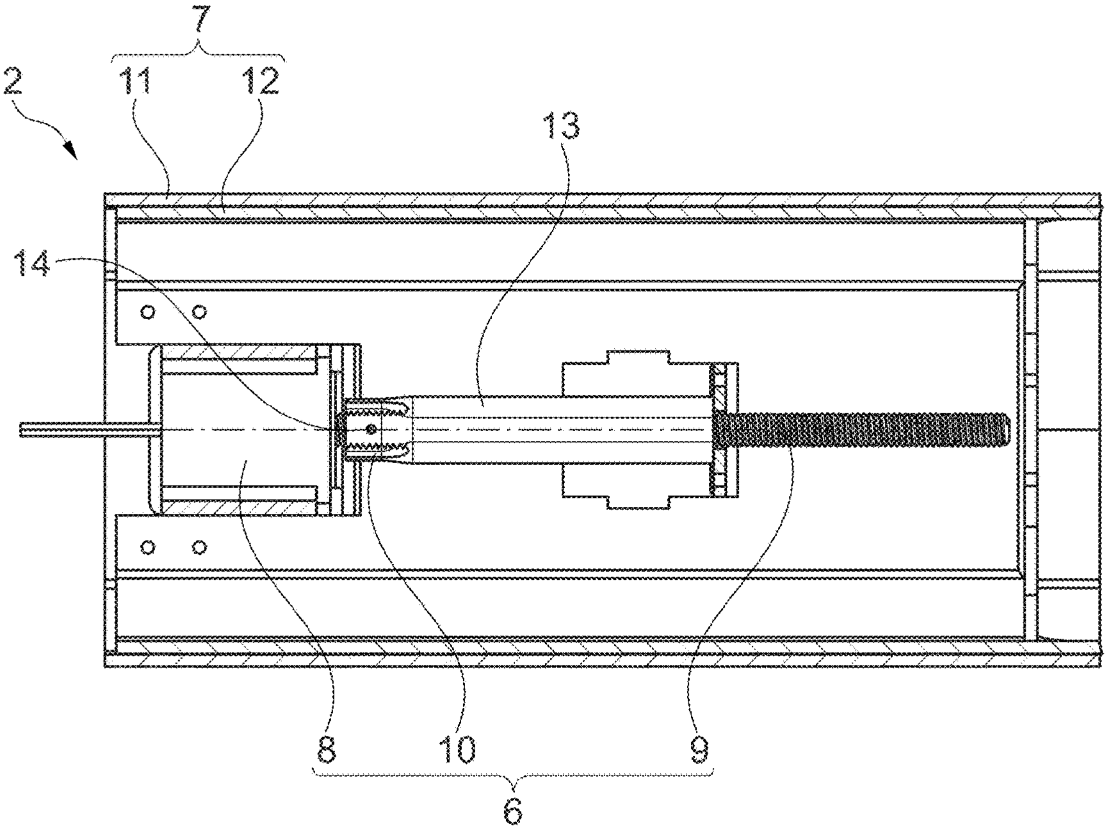
FIG. 3 shows a schematic representation of an adjusting unit according to an embodiment of the disclosure in a sectional view.
Figure 4:
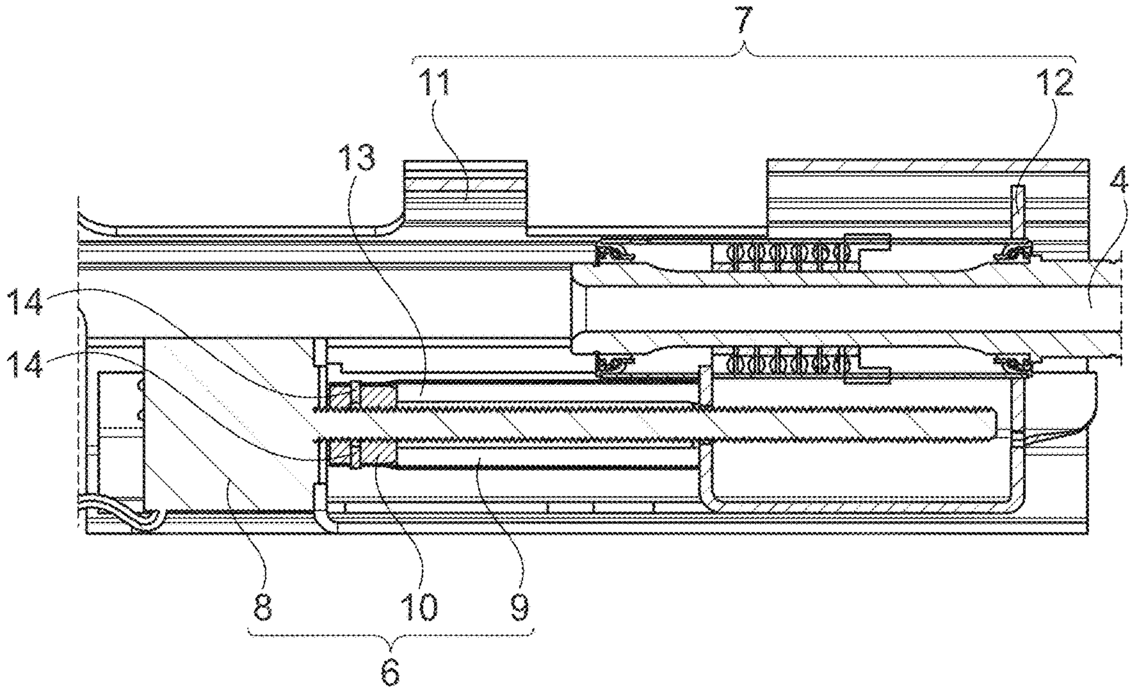
FIG. 4 shows a schematic representation of an adjusting unit according to an embodiment of the disclosure in a longitudinal sectional view.

The adjusting unit 2 (see also FIGS. 2 to 4) has an adjustment unit 6 and a pull-out device 7. The adjustment unit 6 has an adjusting motor 8, a spindle 9, and a spindle nut 10, and the adjusting motor 8 is coupled to the spindle 9 so as to transmit a torque. The spindle nut 10 is arranged on the spindle 9 such that a rotation of the spindle 9 (by the adjusting motor 8) produces an axial movement of the spindle nut 10 along the spindle 9. The adjustment unit 6, in particular the adjusting motor 8, is arranged in a fixed position in the pull-out device 7.

The pull-out device 7 has a pull-out support 11 and an inner pull-out element 12. The pull-out support 11 can be attached to a vehicle body in an axially fixed manner and such that it can pivot around a pivot axis, and the inner pull-out element 12 is arranged in the pull-out support 11 in an axially movable manner relative thereto. Furthermore, the inner pull-out element 12 is coupled in an axially fixed manner to the steering shaft 4, so that the steering shaft 4 can be axially moved by the adjustment unit 6 via the inner pull-out element 12.

Figure 5:
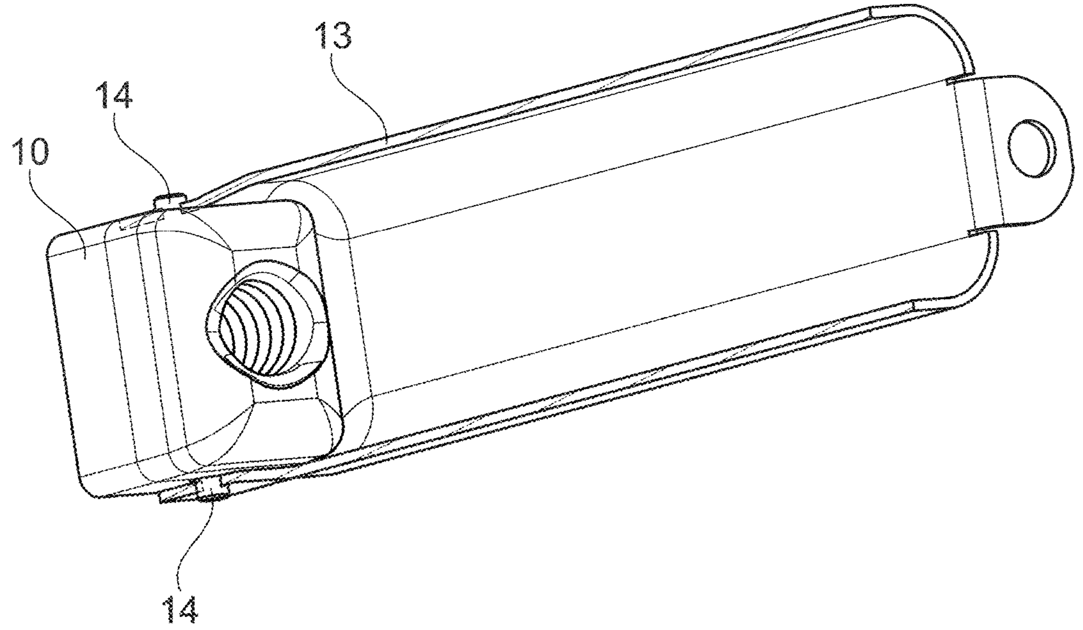
FIG. 5 shows a schematic representation of a crash element and a spindle nut according to an embodiment of the disclosure in a perspective sectional view.
Figure 6:
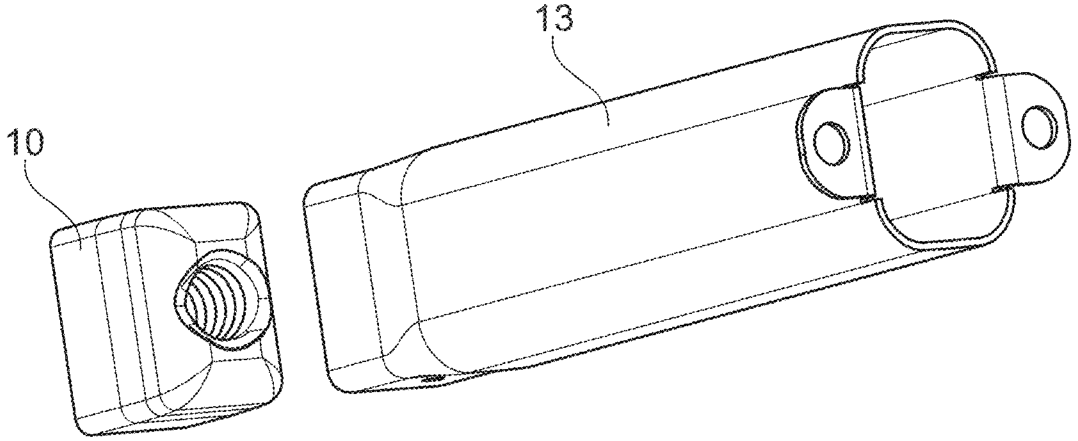
FIG. 6 shows a schematic representation of a crash element and a spindle nut according to an embodiment of the disclosure in an exploded view.

Furthermore, the adjusting unit 2 has a crash element 13, which is designed as a crash sleeve 13 and is arranged coaxially to the spindle 9, surrounding the spindle 9 between the adjusting motor 8 and the inner pull-out element 12. One axial end of the sleeve 13 is arranged on the spindle nut 10 and is coupled thereto in an axially fixed manner via at least one, here two, securing elements 14 (see also FIGS. 5 and 6). Another axial end of the sleeve 13 is coupled to the inner pull-out element 12. Thus, a rotation of the spindle 9 causes an axial movement of the spindle nut 10, and thus also of the sleeve 13, which is coupled in an axially fixed manner to the spindle nut 10, along the spindle 10 and thereby an axial movement of the inner pull-out element 12. In addition, the coaxial arrangement of the sleeve 13 to the spindle 9 makes it possible to integrate the crash element 13 into the force flow of the adjustment unit 6 and thus, in particular in the event of a crash, to reduce or eliminate transverse and/or offset forces acting on the sleeve 13.

The securing element(s) 14 are designed to release the axial coupling between the spindle nut 10 and the sleeve 13 when a specified force (or a predetermined force) is reached or exceeded, which is in particular a specified impact force in the event of a crash, so that a relative axial movement between the sleeve 13 and the spindle nut 10 is possible. Since the spindle nut 10 has a self-locking effect, the spindle nut 10 can be considered to be stationary in the event of a crash, so that the sleeve 13 moves axially relative to the spindle nut 10. In addition, the flat connection of the sleeve 13 to the inner pull-out element 12 both via the front side of the sleeve 13 and via the fastening tabs enables a symmetrical introduction of the impact force over the entire front surface of the sleeve 13 that rests on the inner pull-out element 12. The large support surface enables a high level of tipping rigidity to be achieved.

Figure 8:
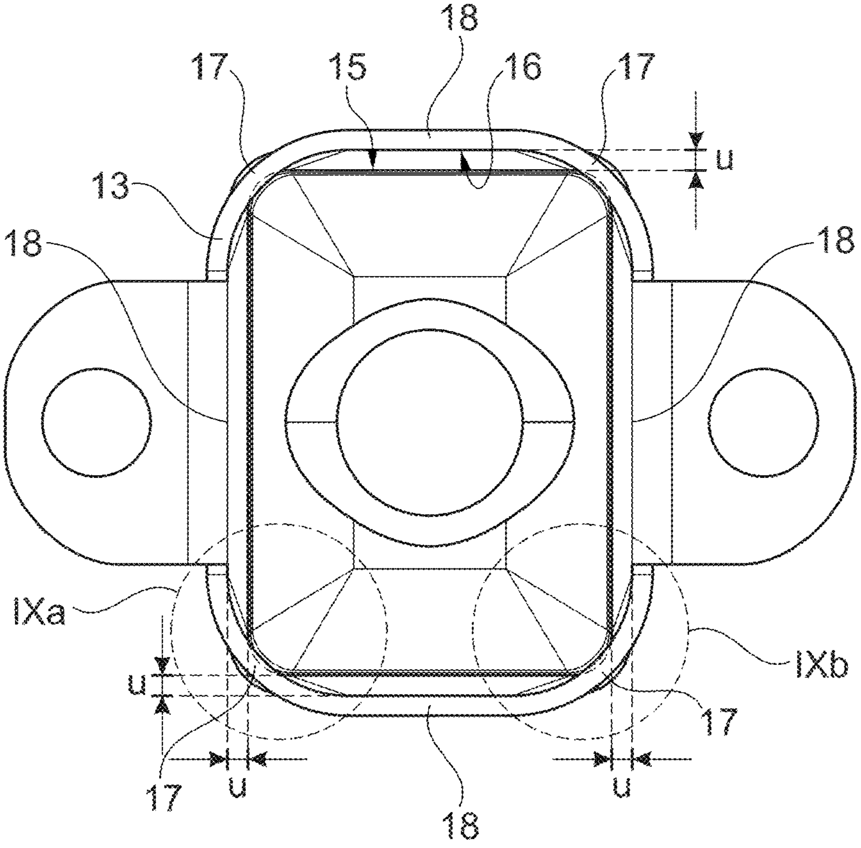
FIG. 8 shows a schematic representation of a crash element and a spindle nut according to an embodiment of the disclosure in a frontal view.
Figure 9:
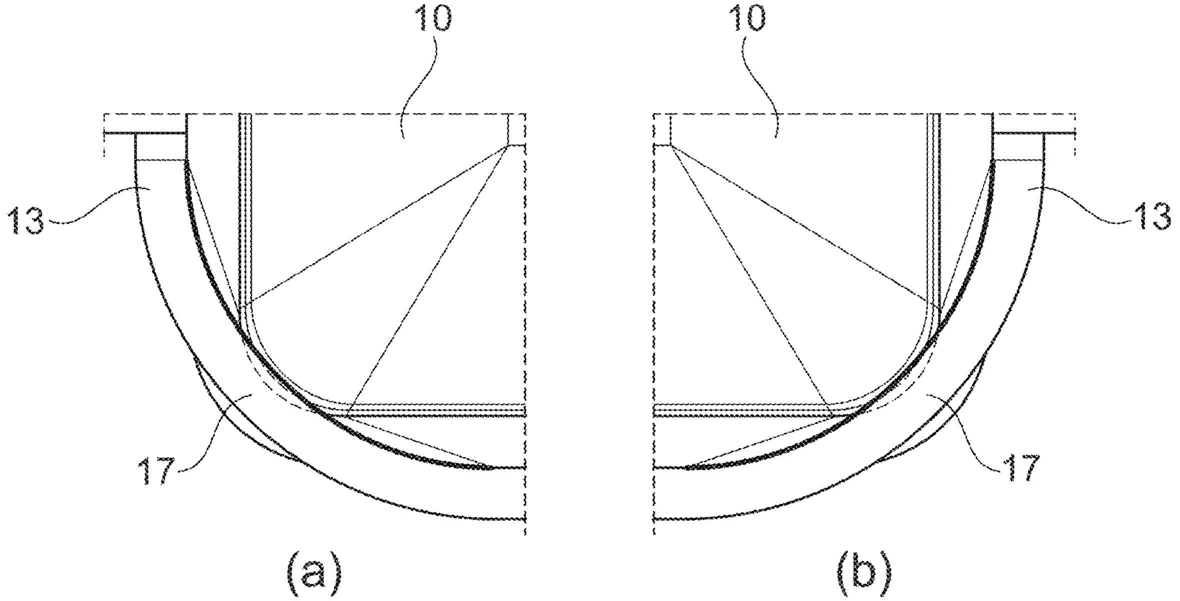
FIG. 9 shows enlarged schematic representations of the detail sections IXa and IXb from FIG. 8.

As shown in FIGS. 8 and 9, an outer contour 15 of the spindle nut 10 and an inner contour 16 of the sleeve 13 are designed at least in some sections such that the outer contour 15 and the inner contour 16 at least partially overlap. More precisely, the inner contour 16 of the sleeve 13 has deformation areas 17, which are arranged here, for example, in the corners of the sleeve provided with radii, and buffer areas 18 which are formed between the deformation areas 17, here, for example, as a straight section of the inner contour 16 of the sleeve 13. The outer contour 15 of the spindle nut 10 and the inner contour 16 of the sleeve 13 overlap in the deformation areas 17 (see detailed views in FIG. 9), and the spindle nut 10 here, for example, is also substantially square and has rounded corners, and the radii of the outer contour 15 of the spindle nut 10 are smaller than the radii of the inner contour 16 of the sleeve 13. In the buffer areas 18, the outer contour 15 of the spindle nut 10 is arranged at a distance from the inner contour 16 of the sleeve 13.

Due to the overlap of the contours 15, 16 in the deformation areas 17, the sleeve 13 is plasticized or deformed in the event of a crash as a result of the axial movement relative to the spindle nut 10 in the deformation areas 17. This means that the inner contour 16 in the deformation areas 17 is adapted to the outer contour 15 of the spindle nut 10, so to speak. Any material required for this purpose comes from the buffer areas 18. It can therefore also be said that the buffer areas 18 are designed to prevent the sleeve 13 from tearing due to plasticization in the deformation areas 17.

Figure 7:
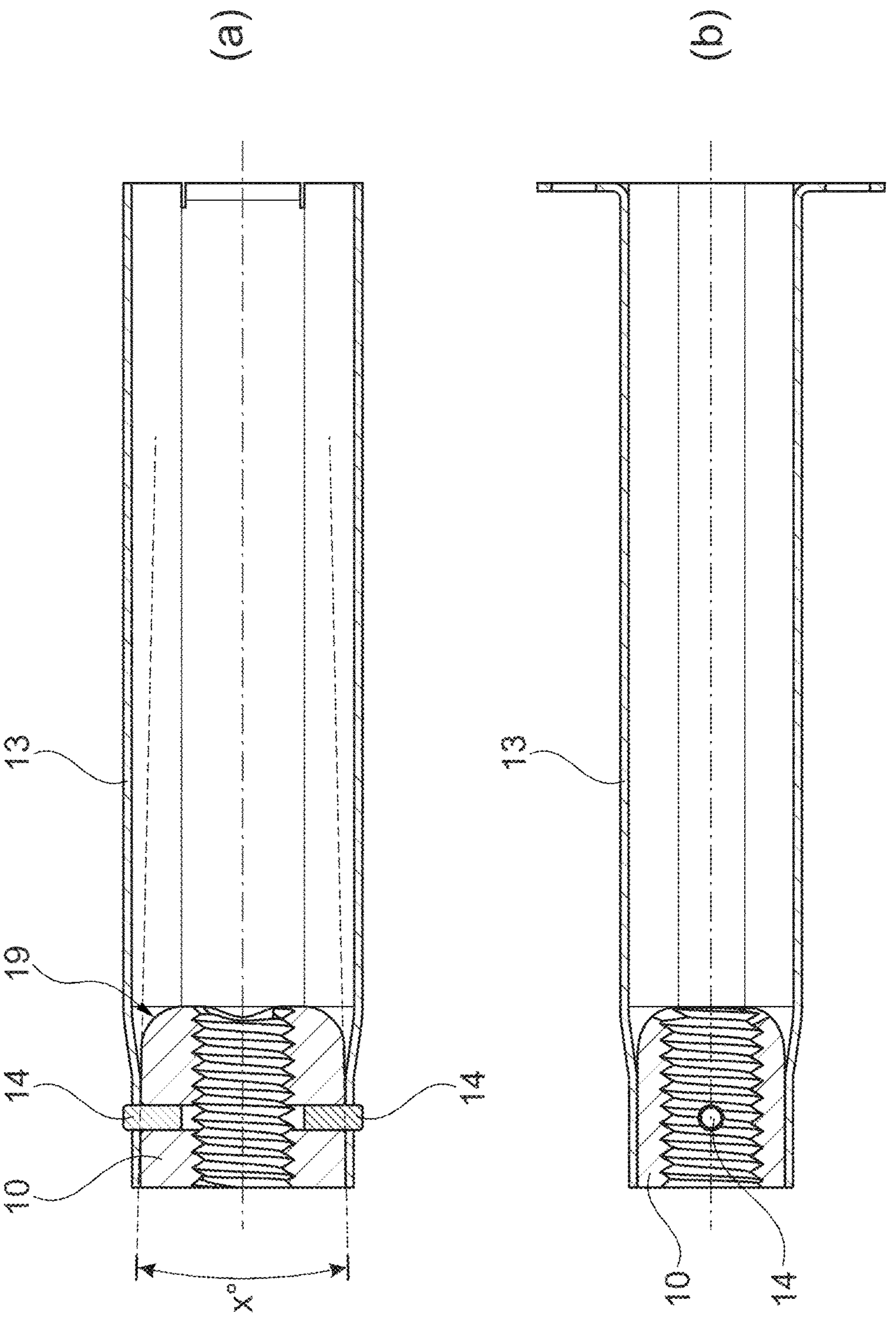
FIG. 7 shows schematic representations of a crash element and a spindle nut according to second embodiments of the disclosure in a longitudinal sectional view.
Figure 10:
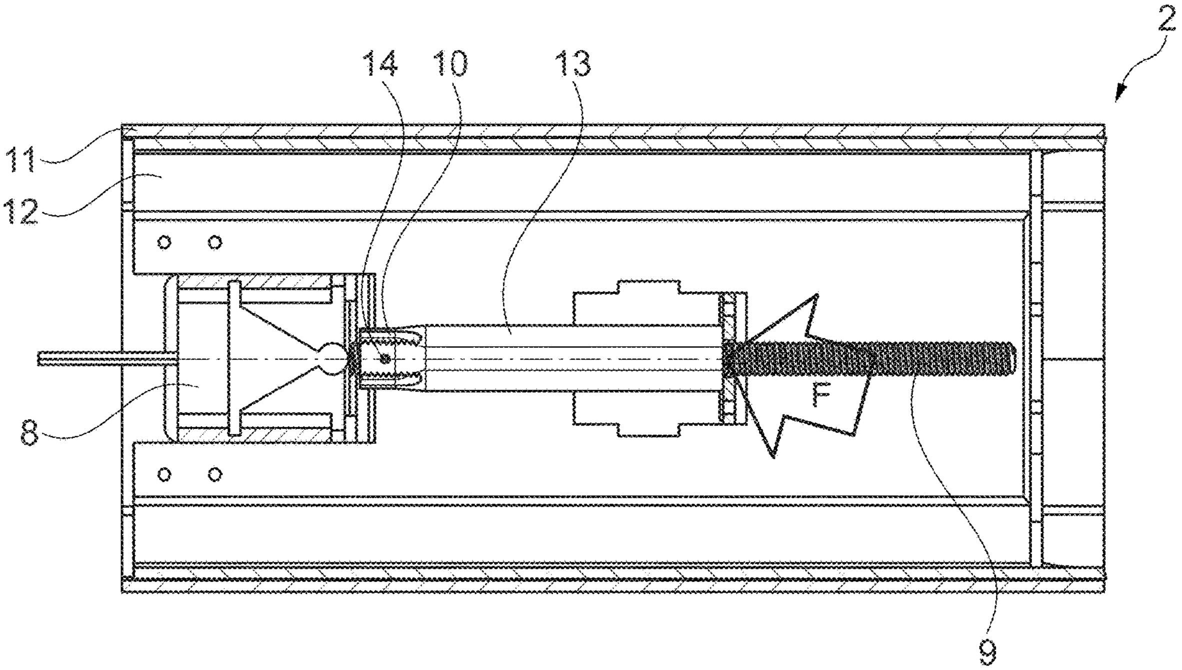
FIG. 10 shows a schematic representation of an adjusting unit according to an embodiment of the disclosure in a sectional view.

As indicated in FIGS. 7 (*a*) and (*b*), the spindle nut 10 is in particular conical (see FIG. 7(*a*)) and/or spherical (see FIG. 7(*b*)) in order to prevent the sleeve 13 from tilting at a front axial end 19 of the spindle nut 10 and/or to simplify an axial movement of the sleeve 13 relative to the spindle nut 10. This is particularly advantageous if, for whatever reason, the impact force (shown here as force arrow F) is not introduced symmetrically into the crash element 13 (see FIG. 10). The conical and/or spherical design of the spindle nut 10 enables self-centering of the sleeve 13 to the spindle nut 10.

Figure 11:
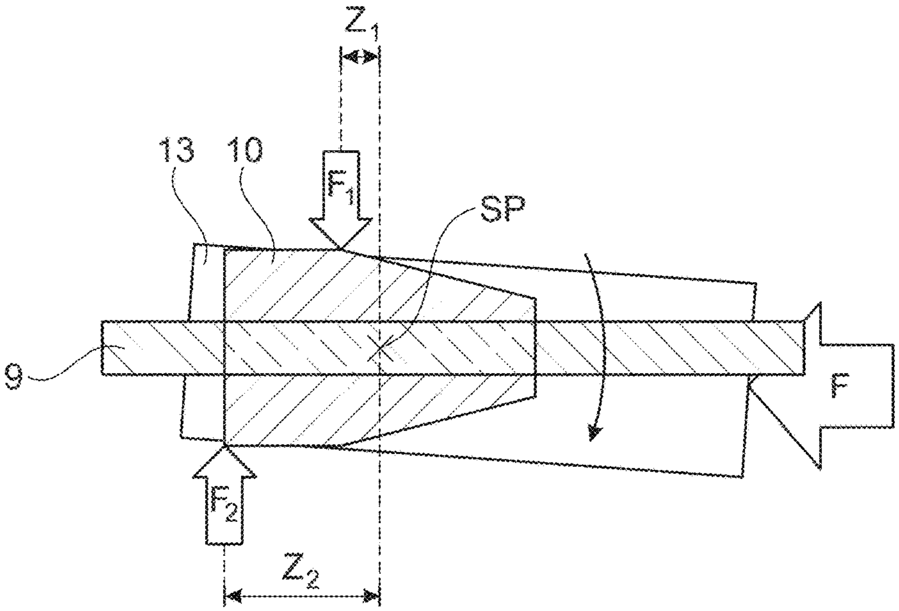
FIG. 11 shows a schematic representation of a self-centering function of a crash element to a spindle nut.

As shown in FIG. 11, the spindle 9 "pulls" the spindle nut 10 through the sleeve 13 due to the fact that a center of gravity SP of the thread pairing between the spindle 9 and the spindle nut 10 lies in front of the restoring forces $F_1$ and $F_2$. Due to the larger restoring torque of $F_2$ (larger lever arm $z_2$), the spindle nut 10 aligns with the spindle 9 in the direction of force of F and thus causes self-centering.

Figure 12:
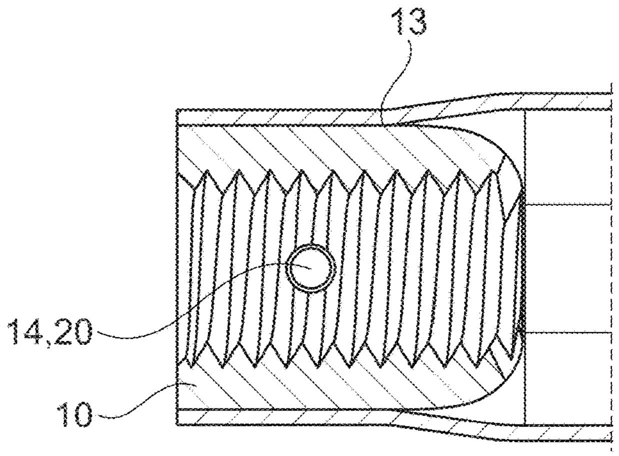
FIG. 12 shows a schematic representation of a securing element according to an embodiment of the disclosure for positioning the crash element on the spindle nut.
Figure 13:
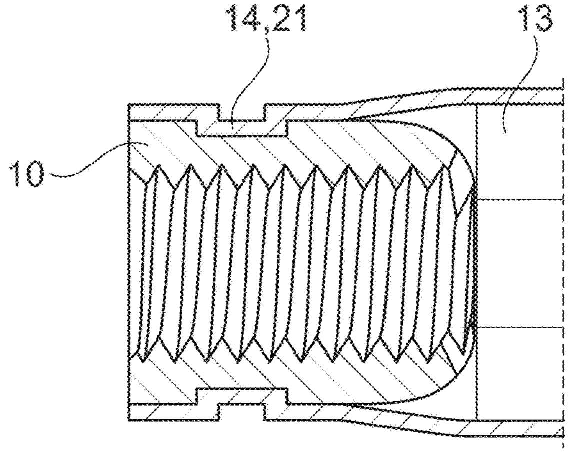
FIG. 13 shows a schematic representation of a securing element according to an embodiment of the disclosure for positioning the crash element on the spindle nut.
Figure 14:
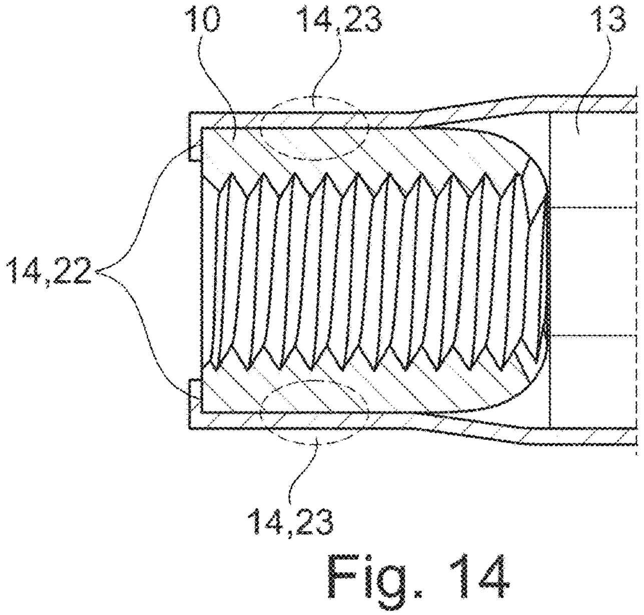
FIG. 14 shows a schematic representation of a securing element according to an embodiment of the disclosure for positioning the crash element on the spindle nut.

FIGS. 12 to 14 show different embodiments of the securing element 14. In FIG. 12, the securing element 14 is designed as a shear pin 20, in particular, two shear pins 20 are arranged on opposite surfaces. The shear pins 20 can be made of metal or plastic, and a breakaway torque for the shear pins resulting from the impact force can be determined by both the material and a diameter of the shear pins 20.

In FIG. 13, the securing element 14 is designed as a circumferential groove 21. The desired or required breakaway torque can be defined via the shape and depth of the groove 21. Furthermore, it is also conceivable to provide several grooves which extend in sections along the circumference of the sleeve 13. The groove 21 enables the forming (formation of the groove 21), joining, and assembly of the spindle nut 10 and sleeve 13 to be carried out in one production step, for example by using the spindle nut 10 as a counter tool when pressing and inserting the groove 21 into the sleeve 13. Alternatively, it is also conceivable to provide one or more "simple" indentations arranged along the circumference instead of sectional grooves.

In FIG. 14, the securing element 14 is divided into two areas: on the one hand, the sleeve 13 has inwardly projecting tabs 22 at one axial end, which prevent independent axial movement in one axial direction. On the other hand, the spindle nut 10 is conical in at least one section 23, which prevents independent axial displacement in the other axial direction. Additionally or alternatively, the conical section 23 of the spindle nut 10 can serve as a securing element 14 by means of positive locking.

In general, the securing elements 14 are arranged in particular in the areas of the sleeve 13 in which no plasticization takes place. For example, if plasticizing takes place in the corner areas of a rectangular sleeve 13 with rounded corners, the securing elements 14 are arranged in particular in the straight or flat sections between the corner areas.

Figure 15:
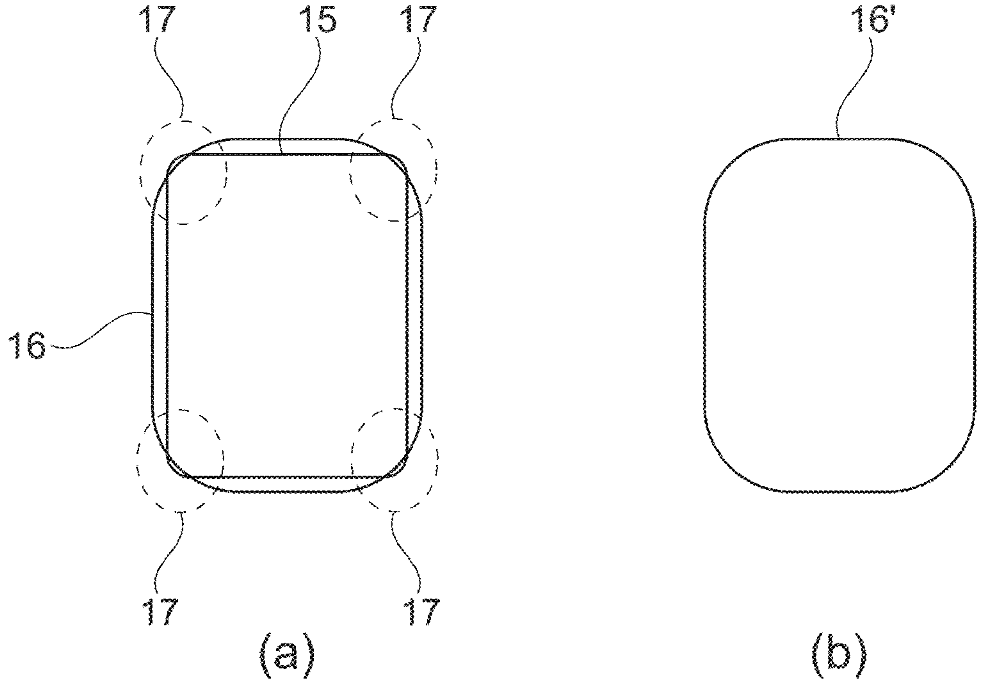
FIG. 15 shows schematic representations to explain an inner contour change of a crash element by plasticization according to an embodiment of the disclosure.
Figure 16:
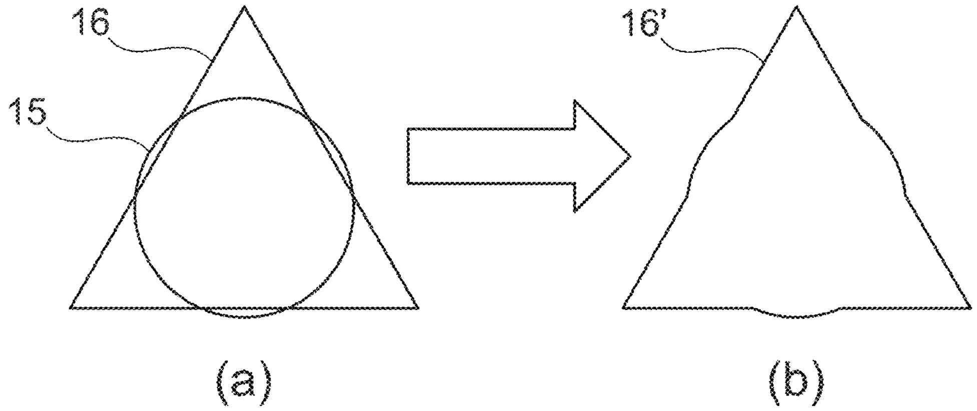
FIG. 16 shows schematic representations to explain an inner contour change of a crash element by plasticization according to an embodiment of the disclosure.

FIGS. 15 and 16 show exemplary combinations of the inner contour 16 of the sleeve 13 and the outer contour 15 of the spindle nut 10 and an inner contour 16' resulting from the plasticization of the sleeve 13 by the spindle nut 10.

In FIG. 15, both the outer contour 15 of the spindle nut 10 and the inner contour 16 of the sleeve 13 are designed as rounded rectangles, and the contours overlap in the area of the rounded corners, which thus form the deformation areas 17 (see FIG. 15(*a*)). FIG. 15(*b*) shows the inner contour 16' of the sleeve 13 after plasticization: the radii in the deformation areas 17 of the inner contour 16' are smaller than the radii of the inner contour 16, and the buffer areas 18, i.e., the straight or flat areas between the deformation areas 17 in the inner contour 16', are slightly longer than those of the inner contour 16.

In FIG. 16, the sleeve 13 has, for example, a triangular inner contour 16 and the spindle nut 10 has a substantially circular outer contour 15, and the outer contour 15 and the inner contour 16 do not overlap in the corners of the triangular inner contour 16, but at the straight or flat sections between the corners (see FIG. 16(*a*)). As a result, the inner contour 16' exhibits slight "bulges" in the area of the previously flat sections after plasticization (see FIG. 16(*b*)).

Figure 17:
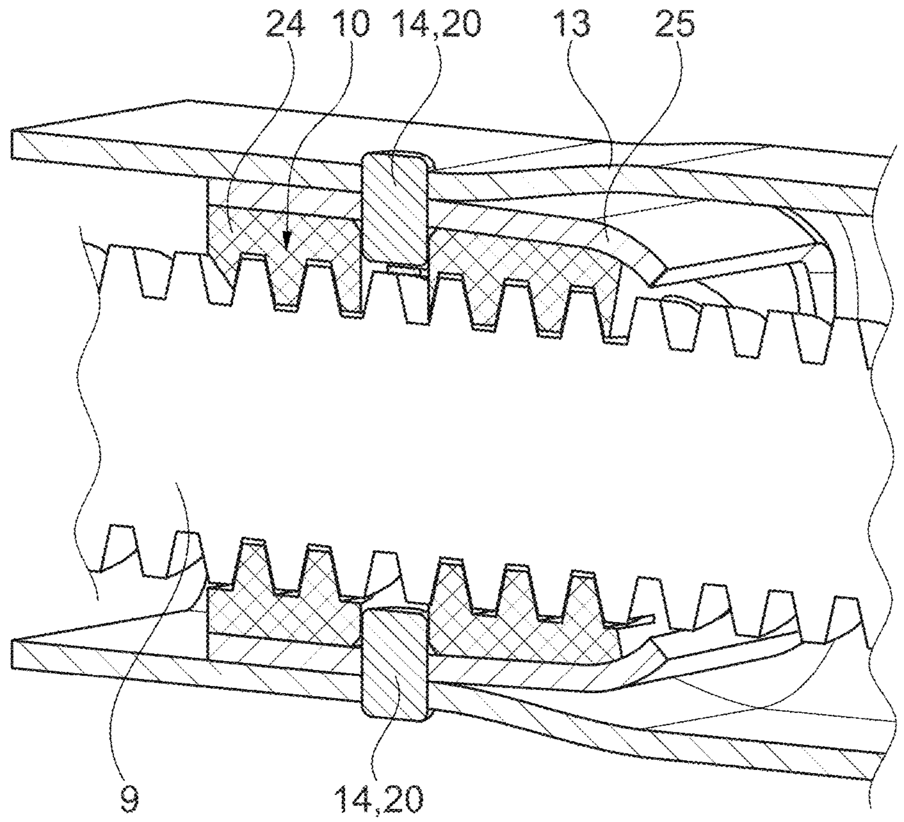
FIG. 17 shows a schematic representation of a spindle nut according to an embodiment of the disclosure.

FIG. 17 shows, as an example, an embodiment of the spindle nut 10, which has a main body 24 made of plastic and a sheath 25 made of sheet metal. The sheet metal of the sheath 15 is in particular deep-drawn and hardened in order to be able to affect the plasticization of the sleeve 13. The main body 24 made of plastic makes it possible to improve the noise behavior of the adjustment unit 6.

LIST OF REFERENCE SYMBOLS

1 Steer-by-wire steering system
2 Adjusting unit
3 Height adjusting unit
4 (Inner) steering shaft
5 Force-feedback actuator
6 adjustment

7 Pull-out device
8 Adjusting motor
9 Spindle
10 Spindle nut
11 Pull-out support
12 Inner pull-out element
13 Crash element/sleeve
14 Securing element
15 Outer contour
16 Inner contour
16' Inner contour
17 Deformation area
18 Buffer area
19 Axial end
20 Shear pin
21 Groove
22 Tab
23 Section
24 Main body
25 Sheath
F Impact force
$F_1$, $F_2$ Restoring force
$z_1$, $z_2$ Lever arm
u Distance
SP Center of gravity

The invention claimed is:

1. An adjusting unit for a steering system of a vehicle, comprising:
an adjustment unit having:
a spindle,
an adjusting motor, the adjusting motor is coupled to the spindle so as to transmit a torque,
a spindle nut, and the spindle nut is arranged on the spindle such that a rotation of the spindle produces an axial movement of the spindle mut along the spindle,
a pullout device having:
a pull-out support, configured to be axially fixed to a body of the vehicle,
and the at least one inner pull-out element disposed in the pull-out support such that the at least one inner pull-out element is axially movable relative to the pull-out support and the at least one inner pull-out element is configured to be axially fixed to a steering shaft,
a crash element configured as a sleeve extends between the spindle nut and the at least one inner pull-out element the crash element arranged coaxially to the spindle and
a first axial end of the sleeve is arranged on the spindle nut and is axially fixed to the spindle nut via at least one securing element
and when a specified impact force is applied to the at least on securing element, the at least one securing element is release and an axial movement of the sleeve relative to the spindle nit occurs and an outer contour of the spindle nut and an inner contour of the sleeve are configured at least in some section such that the sleeve is plasticized as a result of the axial movement of the sleeve relative to the spindle nut.

2. The adjusting unit according to claim 1, wherein the inner contour of the sleeve has deformation areas and buffer areas, and the outer contour of the spindle nut overlaps with the inner contour of the sleeve in the deformation areas.

3. The adjusting unit according to claim 2, wherein the spindle nut has a conical or spherical outer contour.

4. The adjusting unit (2) according to claim 1, wherein a second axial end of the sleeve is coupled flat to the at least one inner pull-out element.

5. The adjusting unit according to claim 1, wherein the sleeve has a rectangular inner contour with rounded corners and the spindle nut has a rectangular outer contour with rounded corners, and the rounded corners of the inner contour of the sleeve have a larger radius than the rounded corners of the outer contour of the spindle nut.

6. The adjusting unit according to claim 1, wherein the adjustment unit is arranged within the pull-out device.

7. The adjusting unit according to claim 1, wherein the sleeve (13) is constructed of a sheet metal.

8. The adjusting unit according to claim 7, wherein the spindle nut is made of a metal which is harder than a material of the sleeve.

9. The adjusting unit according to claim 1, wherein the spindle nut has a main body constructed of a plastic and a sheath (25) constructed of a metal.

10. A steer-by-wire steering system for a vehicle, comprising:
a steering shaft,
a steering element axially fixed to the steering shaft so as to transmit a torque to the steering shaft, and
an adjusting unit according to claim 1,
wherein the steering shaft is arranged within the pull-out support and is axially fixed to the at least one inner pull-out element.

11. An adjusting unit for a steering system of a vehicle, comprising:
an adjustment unit having:
a spindle,
an adjusting motor, the adjusting motor is coupled to the spindle so as to transmit a torque,
a spindle nut, and the spindle nut is arranged on the spindle such that a rotation of the spindle produces an axial movement of the spindle nut along the spindle,
a pull-out device having:
a pull-out support, and
an inner pull-out element axially fixed to a steering shaft, the inner pull-out element axially movable relative to the pull-out support,
a crash sleeve extending: i) around the spindle, and ii) between the spindle nut and the inner pull-out element, and
a first axial end of the crash sleeve is axially fixed to the spindle nut so as to define an axial coupling, and a second axial end of the crash sleeve is axially fixed to the inner pull-out element such that the spindle nut, crash sleeve, and the pull-out support are configured to move axially together, and
when a predetermined impact force is applied to the crash sleeve, the crash sleeve moves axially relative to the spindle nut so as to plastically deform an inner contour of the crash sleeve and release the axial coupling between the spindle nut and the crash sleeve.

12. The adjusting unit according to claim 11, wherein the spindle extends through an end of the crash sleeve.

13. The adjusting unit according to claim 11, wherein the spindle extends through the inner pull-out element.

14. The adjusting unit according to claim 13, wherein the inner pull-out element extends from the pull-out support orthogonally to a longitudinal axis of the crash sleeve.

15. The adjusting unit according to claim 11, wherein the spindle nut has a conical or spherical outer contour configured to engage with the crash sleeve to enable self-centering of the crash sleeve to the spindle nut.

16. An adjusting unit for a steering system of a vehicle, comprising:

an adjustment unit having:

a spindle, an adjusting motor, the adjusting motor is coupled to the spindle so as to transmit a torque, a spindle nut, and the spindle nut is arranged on the spindle such that a rotation of the spindle produces an axial movement of the spindle nut along the spindle, a pull-out device having:

a pull-out support, and an inner pull-out element axially fixed to a steering shaft so that the steering shaft is axially adjusted via the adjusting unit, the inner pull-out element axially movable relative to the pull-out support, a crash sleeve extending between the spindle nut and the inner pull-out element, the crash sleeve arranged coaxially to the spindle, and a first axial end of the crash sleeve is axially fixed to the spindle nut via at least one securing element so as to define an axial coupling, and a second axial end of the crash sleeve is axially fixed to the inner pull-out element such that the spindle nut, crash sleeve, and the pull-out support are configured to move axially together, and when a predetermined impact force is applied to the at least one securing element, the at least one securing element is released and the crash sleeve moves axially relative to the spindle nut so as to plastically deform an inner contour of the crash sleeve and release the axial coupling between the spindle nut and the crash sleeve.

17. The adjusting unit according to claim 16, wherein the crash sleeve has a rectangular inner contour, and corners of the rectangular inner contour are plastically deformed via the spindle nut.

18. The adjusting unit according to claim 17, wherein the at least one securing element comprises an inwardly projecting tab arranged at an axial end of the crash sleeve.

19. The adjusting unit according to claim 16, wherein the at least one securing element comprises a shear pin.

20. The adjusting unit according to claim 16, wherein the at least one securing element comprises a circumferential groove.

* * * * *